United States Patent [19]

Finn

[11] Patent Number: 5,172,651
[45] Date of Patent: Dec. 22, 1992

[54] PIVOTAL GATE TRAP FOR BIRDHOUSE

[76] Inventor: Joseph Finn, 922 Massachusetts Ave., #53, Cambridge, Mass. 02139

[21] Appl. No.: 782,662

[22] Filed: Oct. 25, 1991

[51] Int. Cl.$^5$ .................................... A01K 31/00
[52] U.S. Cl. .................................................. 119/23
[58] Field of Search ............... 119/23, 47, 49, 45.1; 43/61, 67

[56] References Cited

U.S. PATENT DOCUMENTS

| | | | |
|---|---|---|---|
| 3,778,922 | 12/1973 | Clark | 43/61 |
| 3,931,691 | 1/1976 | McCord | 43/61 |
| 4,355,535 | 6/1982 | Lindley | 43/61 |
| 4,471,721 | 9/1984 | Vail | 119/23 |

*Primary Examiner*—Gene Mancene
*Assistant Examiner*—Thomas Price
*Attorney, Agent, or Firm*—William Nitkin

[57] ABSTRACT

A trap for a birdhouse, the moving parts of which are attachably and detachably integrated with bearing, aligning, and attaching features which are permanently part of the birdhouse entry hole panel, achieving reduction of trap structure and greater convenience of use. A pivoting gate is set above the entry hole within the birdhouse, and is retained there by a trip assembly. A bird entering the birdhouse, and alighting on the trigger extension of the rotatable trip assembly, caseus the trip assembly to disengage from the free end of the pivoting gate, which falls, blocking the entry hole ad trapping the bird within. The trap includes a structure to facilitate removal of the trapped bird. The trap has structure to allow an option of sensitive or stable trap settings.

8 Claims, 2 Drawing Sheets

PIVOTAL GATE TRAP FOR BIRDHOUSE

BACKGROUND OF THE INVENTION

1. Field of the Invention

The present invention relates generally to birdhouses and similarly configured feeders, and more specifically, to the convenient repeated attachment and detachment capability of a trap gate and trigger mechanism for trapping undesirable birds for removal from such structures, and for trapping desirable birds for scientific research purposes.

2. Description of Prior Art

Various beneficial and desirable native birds, such as bluebirds and purple martins, benefit from artificial nesting or feeding structures (bird houses and similarly constructed feeders). In North America, however, undesirable non-native birds such as English sparrows often usurp such structures and often destroy the eggs, nestlings or adults of native species. Some native species, such as Mountain Bluebirds, have been threatened with extinction, in part due to this problem which exists in many parts of the world.

It is known that a trap set within such a structure to capture an undesirable bird for removal from the area is effective in keeping the structure available for native birds. Only a "live" trap is safe to use where desirable, legally protected, native birds might be accidentally captured. Such a trap is also useful to capture desirable birds for research purposes, such as banding.

A number of prior art devices are capable of trapping a bird within a birdhouse compartment. *Sialia*, the quarterly journal of the North American Bluebird Society, in Volume 5, Number 3, pages 100-101 (Summer 1983), describes and illustrates a pivotal gate and formed wire trip mechanism permanently mounted on an installable and removable separate panel which is then attached to the inside surface of the original entry hole panel of the birdhouse. While this trap panel, as described, is attached by hand with a wire clip, it is believed to be more conspicuous to wary birds, less conveniently portable or storable within a birdhouse, and less economical to manufacture than the present invention, due to the larger size of this prior art device resulting from its use of the separate panel.

U.S. Pat. No. 4,471,721 (Arthur E. Vail, Griggsville, Ill.) describes a pivotal gate retained by a formed wire trip mechanism, both of which are permanently mounted on a substitute entry hole panel, which is, at the time of trapping, substituted for the original entry hole panel which forms one side of the nesting compartment. This patent (U.S. Pat. No. 4,471,721) applies to features for setting the trap from the outside of the compartment, and to a feature to prevent inadvertent tripping, and to a feature for mounting the separate trap panel in temporary substitution of the original entry hole panel. This patented trap panel, as described by the inventor, is intended primarily for substituting for an original entry hole panel of similar appearance and mounting means in a sheet metal birdhouse. Thus it is likely to be relatively inconspicuous to birds and easily mounted when used in the intended application. However, as this prior art device also relies on a separate substitute trap mounting panel which aligns the moving trap parts, it is also less conveniently portable or storable than the present invention if the present invention were adapted, as is possible, to this application.

*Bluebirds!* by Steve Grooms and Dick Peterson, page 64 (North Word Press Inc., 1991) illustrates another pivotal gate and formed wire trip mechanism both of which are also mounted on an installable/removable substitute entry hole panel which is temporarily substituted for the original entry hole panel at the time of trapping. The bearings of the rotation of the formed wire trip mechanism are formed by holes in two plates which have been pressed into two vertical saw kerfs in the substitute entry panel. These vertical saw kerfs serve only to anchor the bearing tabs. Again, the reliance of this prior art trap on a separate substitute trap mounting panel which aligns the moving trap parts, means this trap is also believed to be more conspicuous, less conveniently portable and storable, and less economical to manufacture than the present invention, due to its possible difference in external appearance (compared with the original entry hole panel) and its larger size.

Spring-activated pivoting gate, and gravity-activated sliding door, birdhouse trapping devices are a part of the general prior art. Such devices known to the present inventor are either mounted as a substitute entry hole panel, inconveniently attached in the field by tool to the inner surface of the original entry hole panel, or hung on the original entry hole panel by a hook which passes through the original entry hole, in an area in which wary birds are especially sensitive to changes. All such devices known to the present inventor are more complex and believed to be more conspicuous to wary birds, are larger and thus less conveniently portable and storable, and are less economical to manufacture, than the present invention.

As discussed above, prior art devices are inferior to the present invention with respect to one or more of the following considerations: inconspicuousness, portability, storability, ease of attachment to a birdhouse and economy of manufacture.

SUMMARY OF THE INVENTION

It is, in general, an object of the present invention to provide a birdhouse (or feeder) trap which is well integrated into birdhouse design and birdhouse management practice, as specified in further objects stated below. The use of the word birdhouse in the specification and claims includes similarly configured birdfeeders.

It is a further object of the present invention to provide a trap which, by relatively small size and simplicity of design, will be inconspicuous to wary birds when temporarily installed in a box already frequented by these birds.

It is a further object of the present invention to provide a trap which, by relatively small size and simplicity of design, will be conveniently carried in the numbers often required by birdhouse trail managers and/or conveniently and compactly stored within a birdhouse, without substantially interfering with the nesting of desirable birds while in the storage mode.

It is a further object of the present invention to provide a trap which is quickly and conveniently installed and set in the field, by hand, without tools.

It is a further object of the present invention to provide a trap which permits convenient removal of the trapped bird.

It is a further object of the present invention to provide a trap which permits settings for greater or lesser tripping sensitivity where inadvertent tripping conditions (such as wind movement) may exist.

It is a further object of the present invention to provide a trap which, by relatively small size and simplicity of design, is economical to manufacture and which, by being integrated into the design of birdhouses inexpensively made "trap-ready", is more affordable in the numbers often required by birdhouse trail managers.

The present invention accomplishes the foregoing objects in the ways to be described after this brief description of the general form and function of the two main moving parts of the trap: A gate member is pivotally mounted within a birdhouse and is retained substantially above the bird entry hole in a retracted position (set mode) by a trip arm, which engages and supports the gate at a location away from the pivot point of the gate. The trip arm is connected to a rotatable axis set into a bearing surface formed in a birdhouse entry hole panel. A trigger arm is connected to the axis or trip arm, so that bird activated movement of the trigger arm, projecting into the inner space of a birdhouse below the entry hole, rotates the entire trip assembly about its axis. This causes the trip arm to disengage from the supported pivoting gate, allowing the free end of the gate to fall and block the entry hole.

The present invention eliminates the separate trap mounting panel or the moving parts aligning and guiding plate common to prior art devices referred to above. The present invention utilizes trap parts adapted to the structure of the original entry hole panel and trap part alignment, bearing and attachment locations formed in the original entry hole panel at the time of manufacture, or at one-time retro-fitting for subsequent continuous trap-readiness.

This elimination of the (prior art) separate trap mounting panel or plate, by integration of the relatively small and simply designed moving and attaching trap parts for attachment to the original entry hole panel, permits a great reduction of size and complexity of trap structure.

It is believed that this reduction of size and complexity of trap structure introduced at the time of trapping, to a birdhouse already frequented by birds, will make this reduced trap structure less conspicuous to these wary birds.

This reduction of size and complexity of the installable and removable portion of trap structure permits birdhouse trail managers to carry larger numbers of traps more conveniently. It also permits convenient storage of the trap pivoting gate and trip mechanism on the floor of the birdhouse, without appreciably taking space or interfering with the nesting activity of desired birds while in the storage mode.

In this invention, the installable/removable pivoting gate has means to quickly and conveniently attach by hand, without tools, to a pre-established pivot point on the original entry hole panel. The installable/removable trip mechanism is placed quickly and conveniently by hand, without tools, and retained in a bearing formation in the original entry hole panel while permitting rotation.

In this invention the pivoting gate has a notch along the lower edge, or a hole near the lower edge, of the gate which covers the lower rim of the entry hole when in the tripped mode. A rod may be inserted through the birdhouse entry hole and into this notch or hole in the gate. When raised, the rod will lift the gate, substantially clearing the entry hole, and allowing the captured bird within to "escape" the dark birdhouse interior to a translucent bag or cage held over the exterior of the entry hole. This is a more convenient means of removing a trapped bird for removal from the area, or for banding.

In this invention, the pivoting gate has a notch or hole sized and shaped according to the cross section of the upper trip arm extension, which notch or hole, along or near the lower edge of the gate (as viewed in the set mode) is at a location away from the pivot point. The engagement of the upper trip arm extension with this closely sized and shaped notch or hole through the pivotal gate plate affords greater frictional contact for optimal trap stability to prevent inadvertent tripping. The lower edge of the gate (as viewed in the set mode) is otherwise straight and smooth, and supporting engagement of the upper surface (only) of the upper trip arm extension with this surface affords lesser frictional contact for optional trap sensitivity when desirable.

The present invention, by integration of a trapping mechanism into the original birdhouse entry hole panel, achieves a reduction of size and complexity of trap structure, and, it is believed, will thus permit an economy of manufacture and equipping large numbers of birdhouses with "trap readiness."

As integration of trap mechanisms with the original entry hole panel is of fundamental importance, overall, in achieving the objects of the invention, some mention is made in this summary of how trap moving parts and fastening and securing means are adapted to original entry hole panel structure, in both preferred and alternative embodiments to be described thoroughly in the Detailed Description section to follow later.

In the preferred embodiment, the axis portion of the trip assembly is set into a horizontal groove formed in the inner face of the original entry hole panel below the entry hole. This horizontal groove may be one of many saw kerfs cut in wood, for example, which is often used to construct birdhouses. Such horizontal formed grooves are desirable to form a ladder for birds to climb up to the entry hole to exit. The preferred embodiment exploits one of these grooves as a bearing means for the rotatable axis of the trip assembly. A bend at one end of the axis forms a lower trip arm extension which spaces the connected trip arm vertical section away from the panel surface below which the axis is set. This spacing extension allows the axis section to join the trip arm vertical section without the latter impinging on the planar panel surface or the corner of the groove. The groove must be formed sufficiently deep and wide to permit rotational movement despite the bends at either end of the axis. The lower trip arm extension and trigger arm section are preferably in the same plane to maximize possible range of rotation out of a bearing groove which must not be made so wide as to compromise trap stability. The axis section of the trip assembly is loosely retained in the groove by a permanently fastened, though not overly tight washer, rotatable by fingertip manipulation of a projection formed by a 90° bend along a line parallel to a tangent of the edge of the washer. The axis section of the trip assembly is installable in, or removable from, the bearing groove by rotation of the washer, so that the straight edge of the washer is parallel to the bearing groove, and the previously overlaying round edges of the washer are rotated away, allowing access to the bearing groove. The projection formed on the washer also serves as a striking and retaining point for the free end of the pivoting gate upon tripping.

An alternative embodiment of the circular rotatable retaining washer described above could be a similarly fastened but manually slidable plate, with formed projection for fingertip manipulation and stopping the free end of the pivoting gate upon tripping. The sliding movement would also allow access to install/remove the trip assembly axis in the bearing groove or to retain the axis in the groove.

An overall alternative trap configuration meets the objects of the invention primarily through the concept of simplifying and reducing trap structure by integrating the same into the original entry hole panel. This configuration to be noted here, and described in detail in the Detailed Description section to follow, is especially suited to retrofitting the tens of thousands of birdhouses already in the field. This could be accomplished conveniently by drilling two holes from outside the birdhouse with a simple drilling template and a cordless drill, to quickly yield permanent "trap readiness." The two aligned holes, so drilled, become the bearings for the pivoting gate and for the rotation of the trip mechanism. In this way the minimally sized and simply designed moving parts are aligned and integrated with the structure of the original entry hole panel to satisfy the objects, as in the configuration described in the preferred embodiment.

DESCRIPTION OF THE PREFERRED EMBODIMENT

While the invention may be embodied in many different forms, a preferred embodiment is illustrated and will be described in specific form with the understanding that the disclosure is to be considered as an exemplification of the principles of the invention and is not intended to limit the invention to the specific embodiment illustrated and described.

Figure 1:
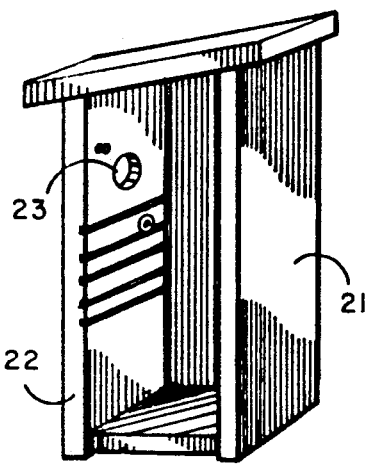
FIG. 1 is a reduced perspective view of an entry hole panel in a birdhouse with one side removed.

Referring to the drawings, FIG. 1 shows a birdhouse 21 with one side removed to expose the interior, as might occur in opening such a birdhouse. The bird entry hole 23 is situated in original entry hole panel 22.

Figure 2:
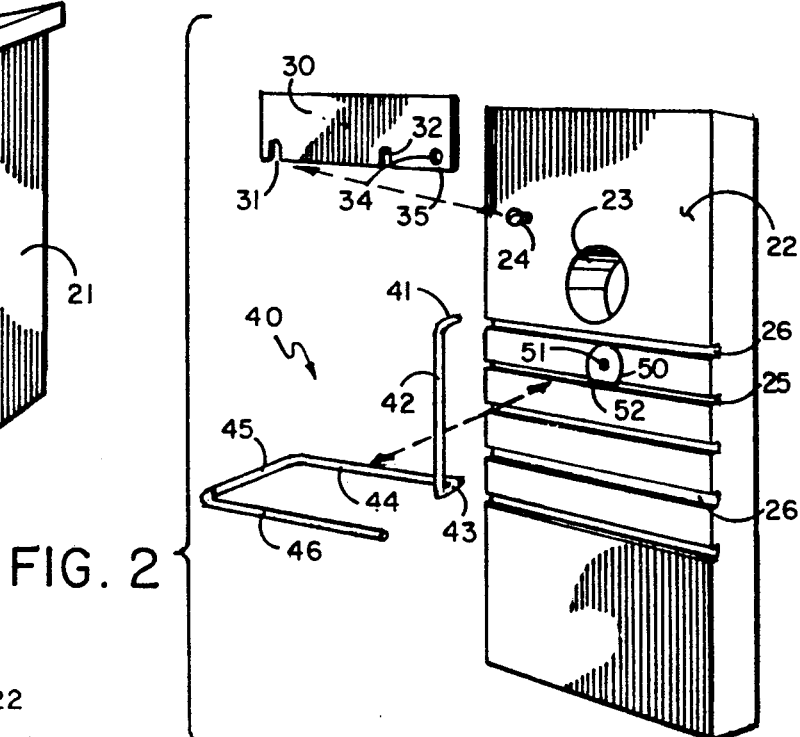
FIG. 2 is a perspective view of an entry hole panel with detached trap pivoting gate and trip assembly.

FIG. 2 shows the original entry hole panel 22 with detached, but readily attachable (and detachable) pivoting gate 30 and trip assembly 40. Original entry hole panel 22 has the following structure, which, once established, yields permanent attachability and detachability of the pivoting gate 30 and trip assembly 40 conveniently, by hand, without the use of tools. Pivot pin 24 has an enlarged head spaced from the planar surface of original entry hole panel 22. This spacing corresponds to the thickness of pivoting gate 30, so that when pivoting gate 30 is set at pivot pin 24 by sliding pivot notch 31 under the head of pivot pin 24, gate 30 is retained pivotally free to move parallel to the planar surface of the original entry hole panel 22. Pivoting gate 30 is detached by sliding pivot notch 31 out from under the enlarged head of pivot pin 24. Pivot pin 24 may be a common fastener, such as a screw, which would allow adjustment relative to the thickness of pivoting gate 30. Pivoting gate 30, in order to be of a certain desirable weight with relatively small size, may preferably be made of a dense and durable material, such as heavy gauge sheet steel.

Figure 9:
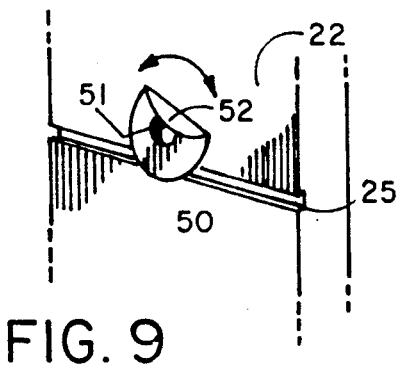
FIG. 9 is an enlarged, partial, perspective view of the retaining washer in the retaining position of the set mode.
Figure 10:
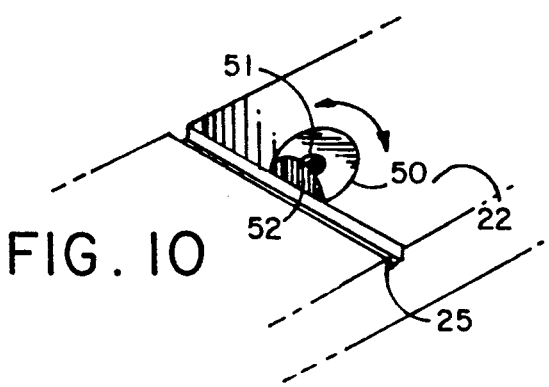
FIG. 10 is an enlarged, partial, inclined, perspective view of the retaining washer in position to accept or release the trip assembly axis.
Figure 11:
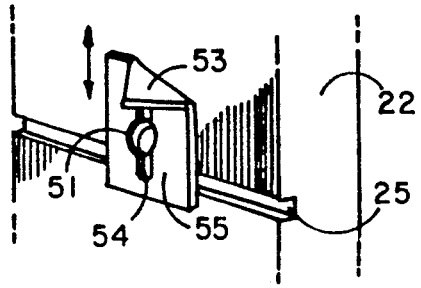
FIG. 11 is an enlarged, partial, perspective view of an alternative embodiment axis retaining plate.

Original entry hole panel 22 also has the following structure which, once established, permits similarly convenient attachment, retention, and detachment of the trip assembly 40. Birdhouses, especially those of wood, may have a desirable series of horizontal grooves formed in the inner face of the original entry hole panel below the entry hole. These ladder grooves 26 enable a bird to climb to the entry hole 23 to exit. A single such groove, or one such groove adapted from a series of grooves, may become bearing groove 25. Bearing groove 25 is adapted to accept and permit the limited rotation of the axis section 44 of trip assembly 40. Axis section 44 is retained in bearing groove 25 during the set mode and tripped mode (as viewed in FIG. 3 and FIG. 4, respectively) by rotational adjustment, as shown in FIG. 9, of retaining washer 50 by fingertip manipulation. Retaining washer 50 is fastened to the surface of original entry hole panel 22 by an enlarged head fastener, such as a screw, which may be adjusted to hold retaining washer 50 parallel to the planar surface of entry hole panel 22. This adjustment, preferably made at the time of birdhouse manufacture, must permit fingertip rotational manipulation of adjusting projection/strike plate 52 so that, as viewed in FIG. 10, bearing groove 25 may be cleared of the previously overlaying edge of retaining washer 50. In this position bearing groove 25 is accessible for insertion or removal of axis section 44 of trip assembly 40. Another embodiment of the axis retaining device described above is illustrated in FIG. 11. A retaining plate 55 with adjusting projection/strike plate variation 53 is movable attached with retaining fastener 51 connecting to original entry hole panel 22 through adjusting slot 54. This embodiment permits the same trip assembly attachment/retention/detachment as the retaining washer 50 described above. Both trip assembly retaining embodiments, when in the set mode, offer a strike plate/adjusting projection (numbered 52 in one embodiment and 53 in the other). These strike plates offer a retaining surface for the striking edge 35 of the pivoting gate 30 at the end of its free pivotal movement upon tripping.

Figure 6:
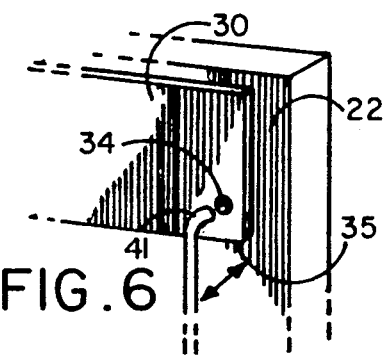
FIG. 6 is an enlarged, partial, perspective view of an engagement means of the pivoting gate and the trip assembly.
Figure 8:
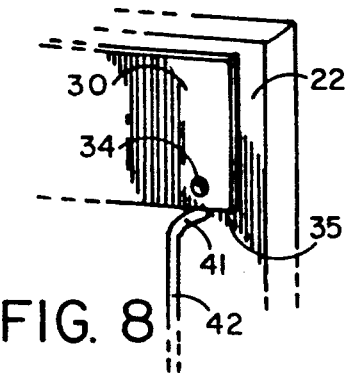
FIG. 8 is an enlarged, partial, perspective view of an optional engagement means of the pivoting gate and the trip assembly.

Prior to tripping, gate 30 is retained in the set mode, substantially above the entry hole, by upper trip arm extension 41 which engages elongate pivoting gate 30 at a location spaced away from the pivot pin 24. As shown in FIG. 6, upper trip arm extension 41 may penetrate stabilizing support hole 34 when conditions such as wind movement (of birdhouse 21 of FIG. 1) may require. As shown in FIG. 8, upper trip arm extension 41 may optionally engage pivoting gate 30 by merely supporting the relatively straight and smooth support/striking edge 35 of pivoting gate 30 against gravitational force which "powers" the trap. This allows less friction than in the engagement option which is shown in FIG. 8, and allows greater trap sensitivity when trapping conditions permit.

Figure 3:
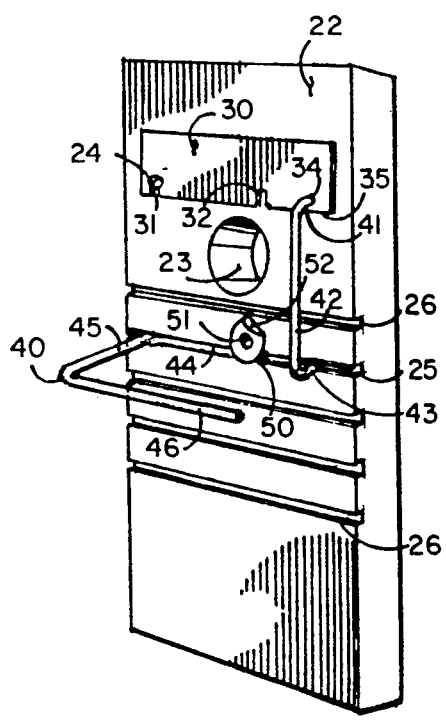
FIG. 3 is a perspective view of an entry hole panel with the trap in the set mode.
Figure 4:
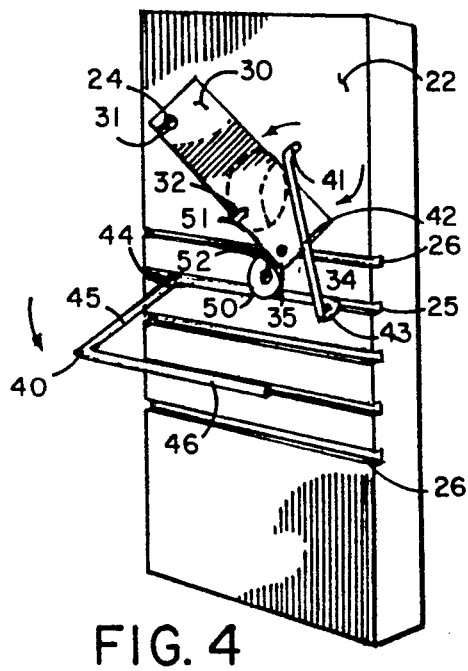
FIG. 4 is a perspective view of an entry hole panel with the trap in the tripped mode.
Figure 5:
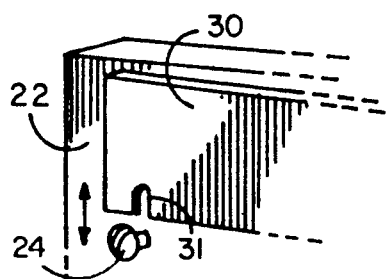
FIG. 5 is an enlarged, partial, perspective view of the attachment means of the pivoting gate.

As seen in FIG. 3, upper trip arm extension 41, which supports the free end of pivoting gate 30, is connected to vertical trip arm section 42 which extends down to a lower trip arm extension 43. Lower trip arm extension 43 connects vertical trip arm section 42 to axis section 44 which is retained below the surface of original entry hole panel 22. Lower trip arm extension 43 spaces vertical trip arm section 42 away from the planar panel surface, preventing the impinging of the vertical trip arm section 42 on this surface. Lower trip arm extension 43 should be in the same plane as trigger lever 45 to permit sufficient rotation of axis section 44. (Additionally, the bearing groove should be of sufficient width, larger than the axis cross section, to allow sufficient rotation to trip the trap despite the bends at the end of axis section 44 which otherwise could bind on the sides of bearing groove 25. Additionally, trip assembly rotation is enhanced and economy of manufacture is achieved, if trip assembly 40, seen in FIG. 2 is formed entirely of stiff cylindrical rod bent at 90° angles so that all trip assembly structure appears to fall within two perpendicular planes.) Trigger lever 45 is extended to an area below the entry hole. When a bird enters the birdhouse and alights on this trigger extension 46, the weight of the bird causes downward rotation of the entire trip assembly 40, disengaging the same from the supported engaged end of pivoting gate 30, allowing pivoting gate 30 to fall by gravity, coming to rest on adjusting projection/strike plate 52 (or 53), thus blocking entry hole 23 and trapping the bird.

Figure 7:
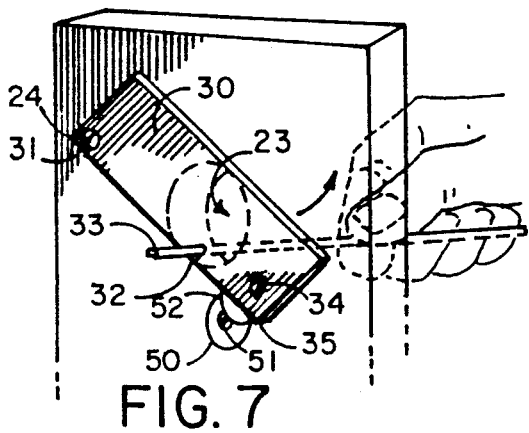
FIG. 7 is a perspective view of operation of the gate opening feature.

As shown in FIG. 7, opening rod 33 may be inserted through entry hole 23 from outside the birdhouse and into opening notch 32. When the rod is raised, the pivoting gate 30 will be lifted, unblocking entry hole 23 and allowing the captured bird to "escape" into a translucent bag or cage for removal from the area or for banding.

Removal of pivoting gate 30 and trip assembly 40 is accomplished by obvious reversal of attachment.

I claim:

1. A bird trap for trapping a bird, said bird trap for use in a birdhouse having an entry panel with an exterior suface and an inner surface with an entry hole defined therein, said entry panel having a first side edge and a second side edge, comprising:

at least one horizontal groove defined in the inner surface of said entry panel disposed below said entry hole;

a pivot pin attached to the inner surface of said entry panel disposed toward said first side edge and positioned above the level of said entry hole;

a gate member having a bottom portion, said gate member disposed against said inner surface, said gate member having a first and second end with said first end in proximity to said first side edge and said second end in proximity to said second side edge, said gate member in a first position positioned above the level of said entry hole and said gate member in a second position covering said entry hole;

pivot means to attach said first end of said gate member to the inner surface of said entry panel on said pivot pin, said pivot means being manually operable without tools;

a trip assembly for interacting with said gate member, said trip assembly including:

an upper trip arm extension having a first and second end, said upper trip arm extension in a first position having its first end engage and support the second end of said gate member at a point toward the second side edge of said entry panel opposite the position of said pivot pin, said upper trip arm extension in a second position to be disengaged from said gate member, said upper trip arm extension when engaged supporting said gate member in its first position, positioning said gate member above said entry hole;

a trip arm vertical segment having a first and second end, said first end of said trip arm vertical segment attached to the second end of said upper trip arm extension, said trip arm vertical segment extending downward at a right angle from said upper trip arm extension;

a lower trip arm extension having a first and second end, said first end attached to said second end of said trip arm vertical segment, said lower trip arm extension extending at a right angle to said trip arm vertical segment parallel to, and in the same direction as, said upper trip arm extension;

an axis section having a first and second end, said first end connected to said second end of said lower trip arm extension, said axis section disposed at a right angle to said trip arm vertical segment, said axis section being parallel to said groove and extending toward the first side edge of said entry panel, said axis section rotatably disposed within said groove;

a trigger lever having a first and second end, said first end attached to the second end of said axis section at a right angle thereto, said trigger lever being positioned parallel to, and disposed in the same direction as, said lower trip arm extension; and a trigger extension having a first and second end, said first end attached to the second end of said trigger lever, and said second end disposed toward said second side edge, said trigger extension extending at a right angle to said trigger lever and parallel to said axis section; and means to retain said axis section in said groove, said means being manually operable without tools, said means further including a strike/retention plate to catch the second end of said gate member when it falls into its second position covering said entry hole when said upper trip arm extension is moved to its second position by the downward movement of said trigger extension, said downward movement caused by the weight of a bird landing on said trigger extension.

2. The bird trap of claim 1 wherein said groove is of a large enough size to avoid substantial contact with said trigger lever and said lower trip arm extension.

3. The bird trap of claim 2 wherein said means to retain said axis section in said groove comprises a manually rotatable retaining washer rotatably affixed to said inner surface of said entry panel with one side of said washer being bent at a right angle, said washer positioned to rotate such that in a first position said bent side when adjacent to said groove does not cover said groove to allow for the insertion of, and removal of, said axis section and when said washer is rotated to a second position, said washer then covers said groove and said axis section, retaining said axis section in position in said groove and said bent section forms said strike/retention plate.

4. The bird trap of claim 2 wherein said means to retain said axis section in said groove comprises a retaining plate manually adjustably positioned on said inner surface of said entry panel, said retaining plate slideably positionable to a first position beyond said groove and said retaining plate upon the positioning of said axis section within said groove being slideable thereover to a second position, retaining said axis section within said groove, said retaining plate further including a strike/retention plate.

5. The bird trap of claim 1 wherein said trip assembly is comprised of a continuous, bent, stiff cylindrical rod.

6. The bird trap of claim 1 wherein said pivot means to attach said first end of said gate member on said pivot pin includes a notch defined in the bottom of said gate member near said first end of said gate member, said notch adapted to fit over said pivot pin.

7. The bird trap of claim 1 wherein said gate member includes an aperture defined at said second end of said gate member adapted to receive said upper trip arm extension therein for the engagement and support of said second end of said gate member in its first position above said entry hole.

8. The bird trap of claim 1 wherein said gate member further includes a notch defined in its bottom portion, said notch accessible through said entry hole when said gate member is in its second closed position, said notch adapted to receive lift means therethrough extended from the exterior surface of said entry panel through said entry hole to lift said gate member and open said entry hole.

* * * * *